(12) United States Patent
Guo et al.

(10) Patent No.: US 10,209,436 B2
(45) Date of Patent: Feb. 19, 2019

(54) SQUARE SEAL, MANUFACTURE METHOD OF SQUARE SEAL AND MANUFACTURE METHOD OF BACKLIGHT MODULE

(71) Applicant: Wuhan China Star Optoelectronics Technology Co., Ltd., Wuhan (CN)

(72) Inventors: Wei Guo, Wuhan (CN); Qing Guo, Wuhan (CN); Pengbo Xu, Wuhan (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 159 days.

(21) Appl. No.: 15/115,685

(22) PCT Filed: May 16, 2016

(86) PCT No.: PCT/CN2016/082271
§ 371 (c)(1),
(2) Date: Jul. 31, 2016

(87) PCT Pub. No.: WO2017/185427
PCT Pub. Date: Nov. 2, 2017

(65) Prior Publication Data
US 2018/0106962 A1    Apr. 19, 2018

(30) Foreign Application Priority Data
Apr. 28, 2016    (CN) .......................... 2016 1 0277806

(51) Int. Cl.
*B32B 37/12* (2006.01)
*F21V 8/00* (2006.01)
(Continued)

(52) U.S. Cl.
CPC ............ *G02B 6/0093* (2013.01); *B32B 37/10* (2013.01); *B32B 37/12* (2013.01); *C09J 5/02* (2013.01);
(Continued)

(58) Field of Classification Search
CPC .... G02B 6/0092; G02B 6/0093; B32B 37/12; B32B 7/06; B32B 7/12; B32B 2551/00;
(Continued)

(56) References Cited

U.S. PATENT DOCUMENTS 5,636,782 A * 6/1997 Moore .................... B65D 27/00
206/5
6,017,408 A * 1/2000 Rogers ...................... G09F 3/20
156/248

(Continued)

FOREIGN PATENT DOCUMENTS

CN    105467690 A    4/2016

*Primary Examiner* — John L Goff, II
(74) *Attorney, Agent, or Firm* — Leong C. Lei

(57) ABSTRACT

The present invention provides square seal, a manufacture method of square seal and a manufacture method of a backlight module. The square seal utilizes the roulette design. As being assembled, the redundant material outside the roulette is removed along the roulette to obtain the square seal of narrow frame so that the square seal achieves the narrow frame without the issues of overflow seal and waste material adhesion. The square seal can be easily separated from the waste material to effectively reduce the defect rate. In the manufacture method of the square seal according to the present invention, the square seal inner frame line is first cut on the seal body film material, and then the dotted roulette is formed at position of the square seal outer frame line is pre formed, and finally, the circle of the square seal reserved outer frame line is cut at the periphery of the roulette.

5 Claims, 7 Drawing Sheets

(51) Int. Cl.
*G02F 1/13* (2006.01)
*G02F 1/1333* (2006.01)
*C09J 7/25* (2018.01)
*B32B 37/10* (2006.01)
*C09J 5/02* (2006.01)
*C09J 7/10* (2018.01)
*C09J 7/38* (2018.01)

(52) U.S. Cl.
CPC ............... *C09J 7/10* (2018.01); *C09J 7/255* (2018.01); *G02F 1/13* (2013.01); *G02F 1/1333* (2013.01); *B32B 2551/00* (2013.01); *C09J 7/38* (2018.01); *C09J 2201/20* (2013.01); *C09J 2201/28* (2013.01); *C09J 2203/318* (2013.01); *C09J 2203/326* (2013.01); *C09J 2467/006* (2013.01)

(58) Field of Classification Search
CPC ......... C09J 7/00; C09J 7/20; C09J 7/22; C09J 7/255; G09F 3/10; Y10T 428/14; Y10T 428/1471; Y10T 428/1476
USPC .............. 156/249; 428/1.61, 40.1, 41.7, 41.8
See application file for complete search history.

(56) References Cited

U.S. PATENT DOCUMENTS

| | | | | |
|---|---|---|---|---|
| 6,187,405 B1 * | 2/2001 | Rudin | ................. | B41L 1/22 428/355 RA |
| 2009/0066075 A1 * | 3/2009 | Hirose | ................. | G09F 3/10 283/81 |
| 2014/0044915 A1 * | 2/2014 | Niwa | ................. | C08K 7/22 428/80 |

* cited by examiner step 10, providing square seal, comprising an adhesive material body (1'), a first protective film (14) and a second protective film (15) which are respectively located at two sides of the adhesive material body (1'), and the adhesive material body (1') is a frame shape, and comprises a rectangular square seal inner frame line (11) at an inner side, a rectangular square seal reserved outer frame line (13) at an outer side, a rectangular roulette (12) on the adhesive material body (1') and the first protective film (14) correspondingly between the square seal inner frame line (11) and the square seal reserved outer frame line (13); ⎯10 step 20, providing a light guide plate (31) and sealant (32), and the sealant (32) is located at periphery of the light guide plate (31), and after ripping off the second protective film (15) on the square seal, attaching one side exposing the adhesive material body (1') on the sealant (32); ⎯20 step 30, providing a pressing jig, and the pressing jig comprises an upper jig (51) and a lower jig (52), and employing the upper jig (51) and the lower jig (52) to press periphery edges of the light guide plate (31) and the sealant (32) respectively from above and below, and ripping away material of the adhesive material body (1') and the first protective film (14) outside the roulette (12) along the roulette (12), and removing the pressing jig, and ripping off the rest first protective film (14) on the adhesive material body (1') to obtain the backlight module. ⎯30

Fig. 7

SQUARE SEAL, MANUFACTURE METHOD OF SQUARE SEAL AND MANUFACTURE METHOD OF BACKLIGHT MODULE

FIELD OF THE INVENTION

The present invention relates to a display skill field, and more particularly to square seal, a manufacture method of square seal and a manufacture method of a backlight module.

BACKGROUND OF THE INVENTION

The Liquid Crystal Display (LCD) possesses advantages of thin body, power saving and no radiation to be widely used in many application scope, such as LCD TV, mobile phone, personal digital assistant (PDA), digital camera, notebook, laptop, and dominates the flat panel display field.

With the rapid development of the smart phone, the relationship of human and the smart phone gets closer and closer. The user has higher and higher requirement for the smart phone. The high resolution high brightness, elegant appearance smart phone is favored by the user; in the development from the small screen phone of wide frame in the beginning to the large screen phone of narrow frame, the phone screen of narrow frame has already become the main trend of the phone development.

The advantages of the phone screen of narrow frame are very obvious. One is that the screen occupation ratio is raised to decrease the extra area of the cell phone, and to enhance the operation sense of the smart phone touch screen; two is that the phone volume is decreased, and the transverse width of the phone of narrow frame is narrower than the transverse width of the phone of regular frame; three is that the visual effect is promoted to make the result of watching the phone screen by the user better.

For the cell phone of narrow frame, the LCD frame needs to be narrow, and the side frame of the backlight module needs to be narrow, too, and the two cooperates to realize the Liquid Crystal Module (LCM) of narrow frame; as shown in FIG. 1, the LCM according to prior art mainly comprises a backlight module 100, a liquid crystal panel 300 installed above the backlight module 100, wherein the backlight module 100 specifically comprises a LED lamp, sealant 110, square seal 120, a light guide plate 130, a brightness enhancement film and a diffusion film. As working, the LED lamp emits light, and the light is scattered by the light guide plate 130, and after the focus of the respective film layers, the surface of the entire backlight module 100 uniformly emits light; the sealant 110 is located at periphery of the light guide plate 130, and the backlight module 100 utilizes the structure with the cooperation of the sealant 110 and the square seal 120 to fix the liquid crystal panel 300 above. At present, the achievement of the narrow frame design is mainly to decrease the widths of the sealant 110 and the square seal 120 to diminish the side frame width. However, the square seal is hard to be cut of being narrow, and the overflow seal situation happens in the cutting narrow process, and the waste material is adhered. It results in that the duct tape cannot be separated from the waste material to reduce the yield. Therefore, the narrow frame of the present backlight module is mainly restricted on the square seal.

SUMMARY OF THE INVENTION

An objective of the present invention is to provide square seal, utilizing the roulette design, which can realize the narrow frame of the square seal.

Another objective of the present invention is to provide a manufacture method of square seal, capable of realizing the narrow of the square seal by cutting and assembling the square seal with the roulette.

Another objective of the present invention is to provide a manufacture method of a backlight module, realizing the narrow frame of the backlight module by attaching the square seal of narrow frame on the sealant of the backlight module.

For realizing the aforesaid objectives, the present invention provides square seal, comprising an adhesive material body, a first protective film and a second protective film which are respectively located at two sides of the adhesive material body, and the adhesive material body is a frame shape, and comprises a rectangular square seal inner frame line at an inner side, a rectangular square seal reserved outer frame line at an outer side, a rectangular roulette on the adhesive material body and the first protective film correspondingly between the square seal inner frame line and the square seal reserved outer frame line.

The roulette is formed by forming multiple sections of separated slits on the adhesive material body and the first protective film, and positions of four corners of the roulette are cut L shape slits.

A length of each section of slit on the roulette is larger than a length between two adjacent slits.

The first protective film and the second protective film are PET films.

The present invention further provides a manufacture method of square seal, comprising steps of:

step 1, providing seal body film material, and the seal body film material comprises a first surface and a second surface which are opposite, and upturning the first surface of the seal body film material, and locating a circle of rectangular inner frame line on the seal body film material, and cutting along the inner frame line to remove material inside the inner frame line to form a square seal inner frame line, and then attaching a layer of PET film on the first surface of the seal body film material to form a first protective film;

step 2, overturning the seal body film material to upturn the second surface of the seal body film material, and locating a circle of rectangular outer frame line at periphery of the square seal inner frame line, and cutting a circle of roulette on the seal body film material and the first protective film along the outer frame line;

step 3, locating a rectangular reserved outer line at periphery of the roulette, and cutting the seal body film material and the first protective film along the reserved outer line, and removing material outside the rectangular reserved outer line to form a square seal reserved outer frame line, and attaching a layer of PET film on the second surface of the seal body film material to form a second protective layer to obtain a square seal;

the square seal comprises an adhesive material body, the first protective film and the second protective film which are respectively located at two sides of the adhesive material body, and the adhesive material body is a frame shape, and comprises the square seal inner frame line at an inner side, the square seal reserved outer frame line at an outer side, the roulette on the adhesive material body and the first protective film correspondingly between the square seal inner frame line and the square seal reserved outer frame line.

In the step 2, a knife is used to cut in sections to cut a circle of multiple sections of separated slits on the seal body film material and the first protective film along the outer frame line, and thus to form the roulette.

A length of each section of slit on the roulette is larger than a length between two adjacent slits.

Positions of four corners of the roulette formed in the step 2 are cut L shape slits.

The present invention further provides a manufacture method of a backlight module, comprising steps of:

step 10, providing square seal, and the square seal comprises an adhesive material body, a first protective film and a second protective film which are respectively located at two sides of the adhesive material body, and the adhesive material body is a frame shape, and comprises a rectangular square seal inner frame line at an inner side, a rectangular square seal reserved outer frame line at an outer side, a rectangular roulette on the adhesive material body and the first protective film correspondingly between the square seal inner frame line and the square seal reserved outer frame line;

step 20, providing a light guide plate and sealant, and the sealant is located at periphery of the light guide plate, and after ripping off the second protective film on the square seal, attaching one side exposing the adhesive material body on the sealant;

step 30, providing a pressing jig, and the pressing jig comprises an upper jig and a lower jig, and employing the upper jig and the lower jig to press periphery edges of the sealant and the light guide plate respectively from above and below, and ripping away material of the adhesive material body and the first protective film outside the roulette along the roulette, and removing the pressing jig, and ripping off the rest first protective film on the adhesive material body to obtain the backlight module.

The step 30 further comprises: locating a layer of sponge at upper, lower two sides of the sealant and the light guide plate before pressing the sealant and the light guide plate with the upper jig and the lower jig so that the stress to the sealant and the light guide plate is uniform.

The benefits of the present invention are: the square seal of the present invention utilizes the roulette design. As being assembled, the redundant material outside the roulette is removed along the roulette to obtain the square seal of narrow frame so that the square seal achieves the narrow frame without the issues of overflow seal and waste material adhesion. The square seal can be easily separated from the waste material to effectively reduce the defect rate. In the manufacture method of the square seal according to the present invention, the square seal inner frame line is first cut on the seal body film material, and then the dotted roulette is formed at position of the square seal outer frame line is pre formed, and finally, the circle of the square seal reserved outer frame line is cut at the periphery of the roulette. The obtained square seal can effectively realize the narrow frame of the square seal, and thus, to realize the narrow frame of the backlight module, and the yield is high. The manufacture method of the backlight module according to the present invention utilizes the aforesaid square seal, which can effectively achieve the narrow frame of the backlight module.

BRIEF DESCRIPTION OF THE DRAWINGS

In order to better understand the characteristics and technical aspect of the invention, please refer to the following detailed description of the present invention is concerned with the diagrams, however, provide reference to the accompanying drawings and description only and is not intended to be limiting of the invention.

In drawings,

FIG. 7 is a flowchart of a manufacture method of a backlight module according to the present invention;

DETAILED DESCRIPTION OF PREFERRED EMBODIMENTS

For better explaining the technical solution and the effect of the present invention, the present invention will be further described in detail with the accompanying drawings and the specific embodiments.

Figure 1:
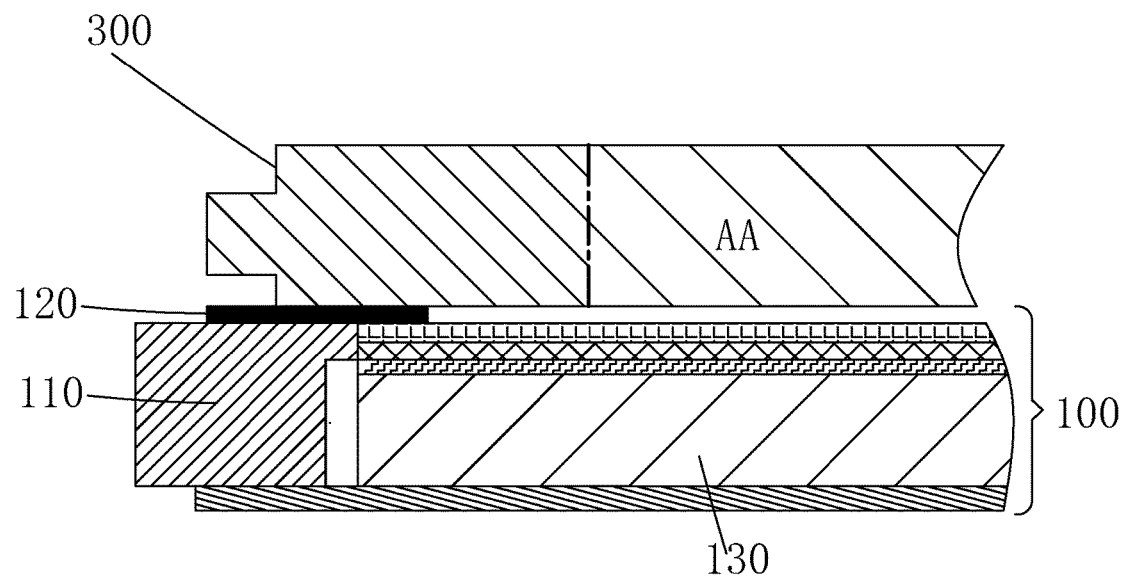
FIG. 1 is a structure diagram of a LCM according to prior art.
Figure 2:
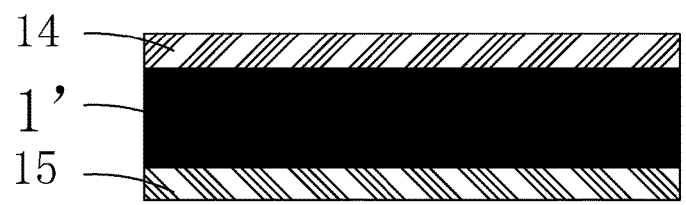
FIG. 2 is a sectional structure diagram of square seal according to the present invention.
Figure 6:
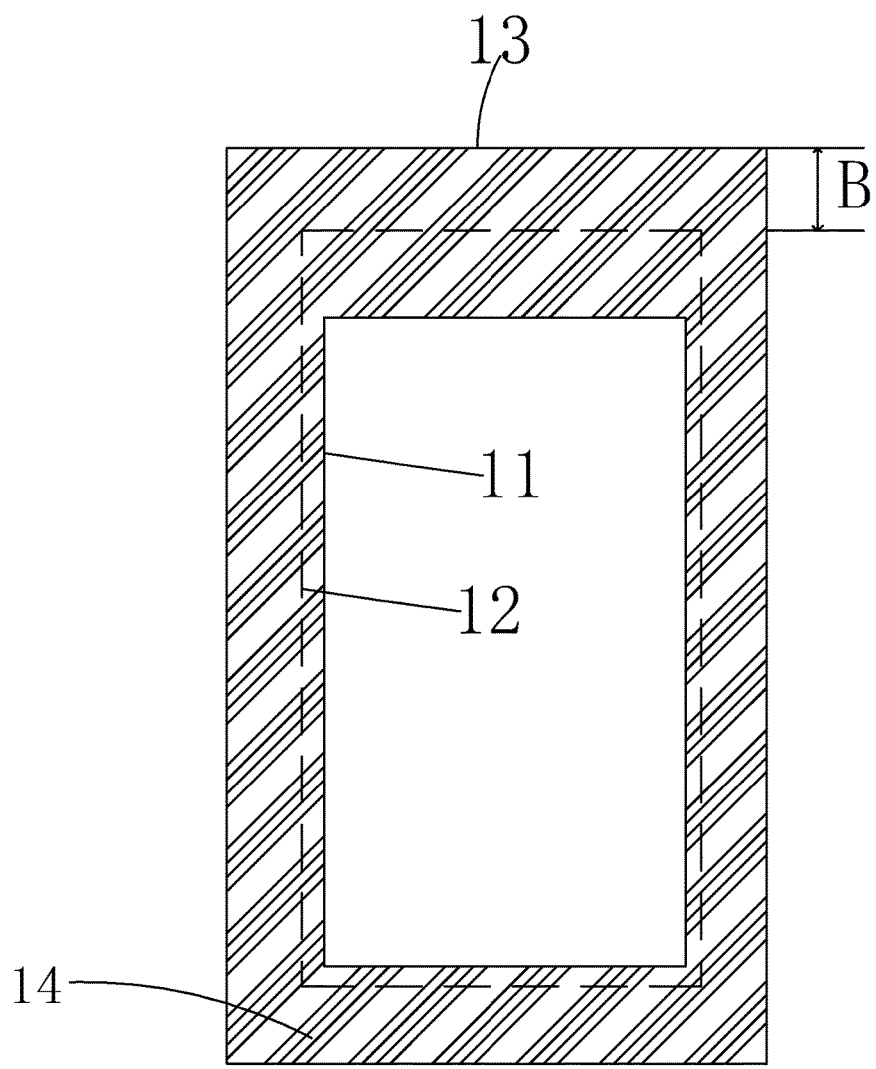
FIG. 6 is a diagram of step 3 of the manufacture method of square seal according to the present invention and also a structure top view diagram of square seal according to the present invention.

Please refer to FIG. 2 and FIG. 6. The present invention provides square seal, comprising an adhesive material body 1', a first protective film 14 and a second protective film 15 which are respectively located at two sides of the adhesive material body 1', and the adhesive material body 1' is a frame shape, and comprises a rectangular square seal inner frame line 11 at an inner side, a rectangular square seal reserved outer frame line 13 at an outer side, a rectangular roulette 12 on the adhesive material body 1' and the first protective film 14 correspondingly between the square seal inner frame line 11 and the square seal reserved outer frame line 13.

Specifically, the square seal of the present invention is assembled on the backlight module for realizing the narrow frame of the square seal, and thus to realize the narrow frame of the backlight module. As assembling, the second protective film 15 on the square seal is first ripped off, and the square seal is attached on the sealant 32 of the backlight module, and then, material of the adhesive material body 1' and the first protective film 14 outside the roulette 12 is ripped away along the roulette 12 so that the square seal can be easily separated from the waste material. The square seal achieves the narrow frame without the issues of overflow seal and waste material adhesion, and thus, to realize the narrow frame of the backlight module.

Specifically, the roulette 12 is formed by forming multiple sections of separated slits on the adhesive material body 1' and the first protective film 14, and positions of four corners of the roulette 12 are cut L shape slits, and then are convenient to be ripped away.

Specifically, the roulette 12 is employed for the ripping away for the following waste material. The difficulty level of ripping away can be adjusted with the length of the slits on the roulette 12 and the length between two slits. Apparently, the longer the slit is, the gap between the two slits is shorter, and ripping away becomes easier. Thus, preferably, the length of each section of slit on the roulette 12 is larger than a length between two adjacent slits.

Specifically, the first protective film 14 and the second protective film 15 are PET films.

Figure 3:
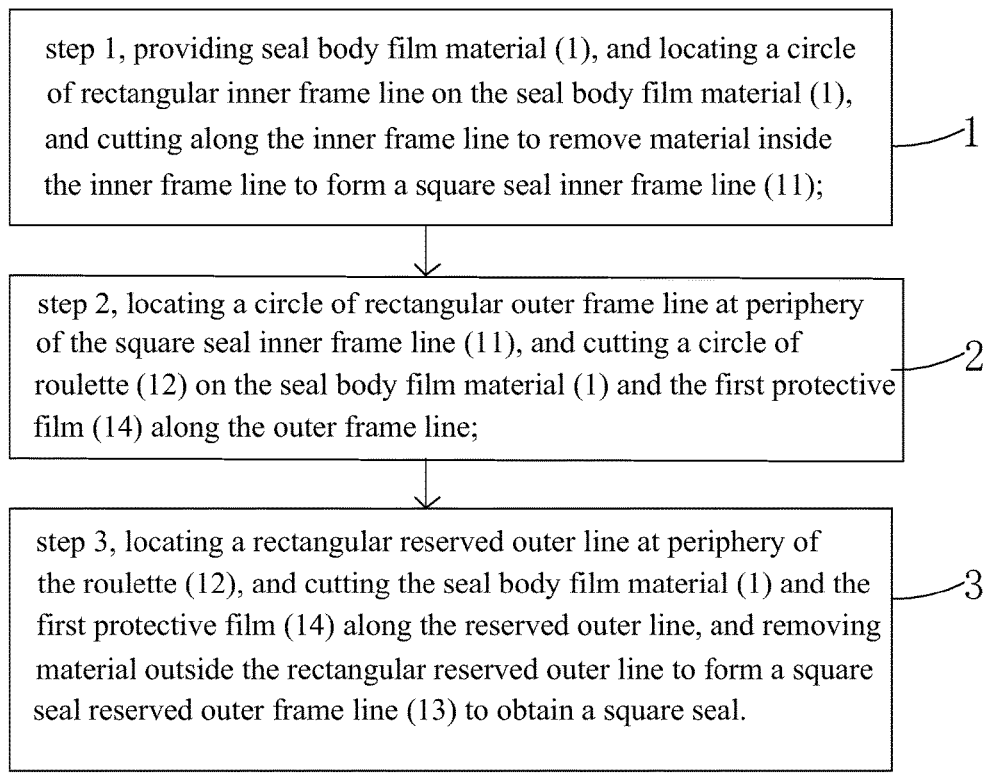
FIG. 3 is a flowchart of a manufacture method of square seal according to the present invention.
Figure 4:
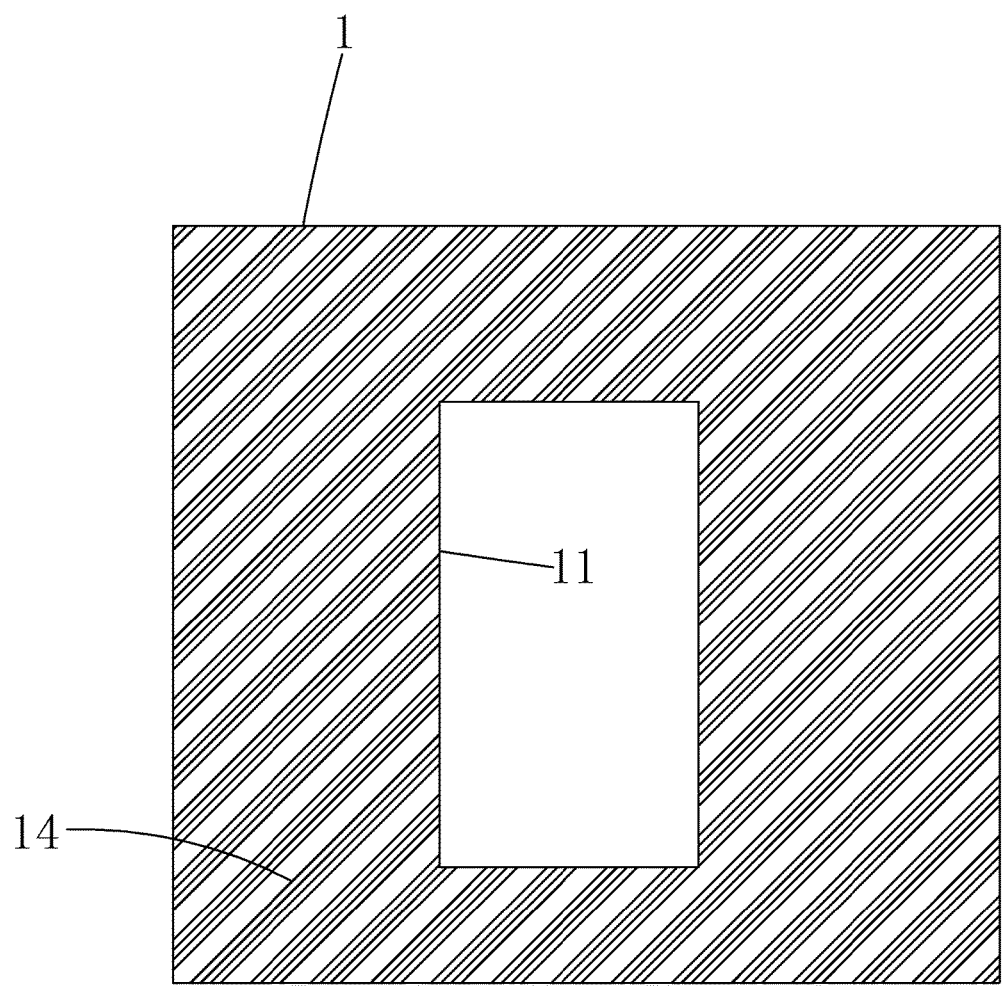
FIG. 4 is a diagram of step 1 of the manufacture method of square seal according to the present invention.
Figure 5:
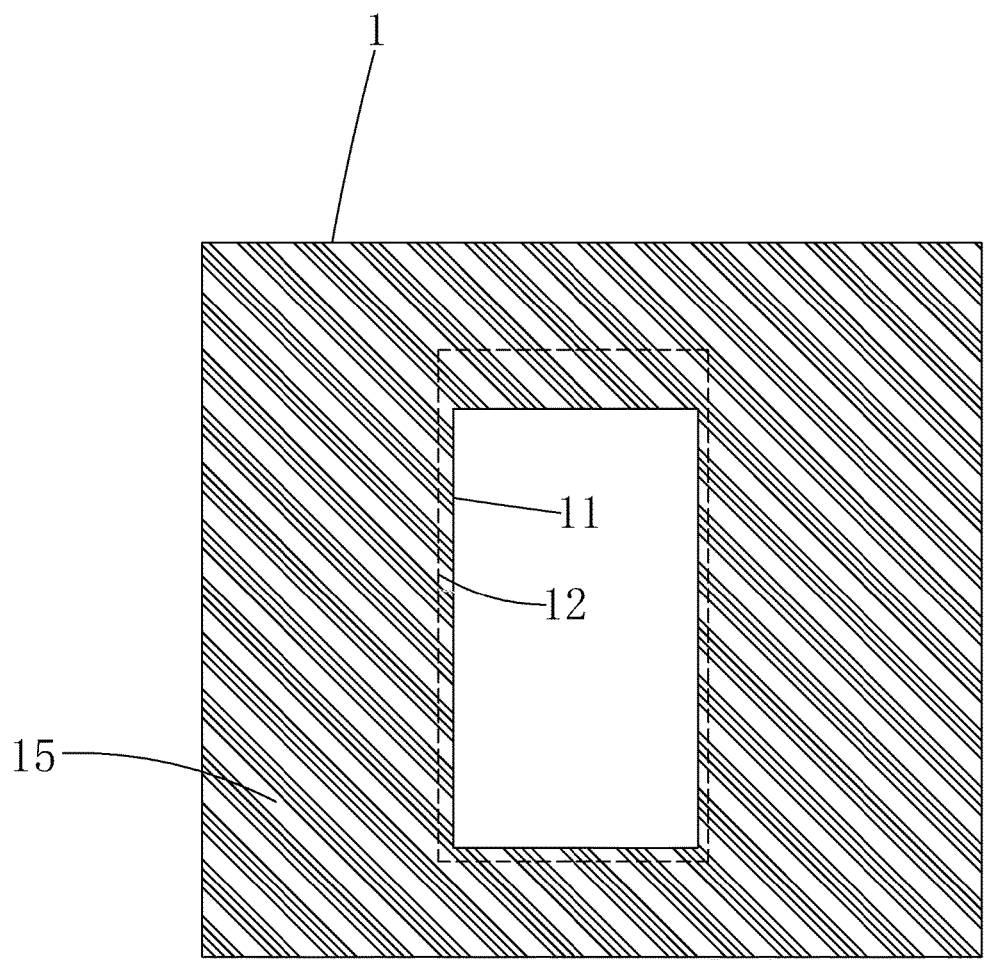
FIG. 5 is a diagram of step 2 of the manufacture method of square seal according to the present invention.

Please refer to FIG. 3. The present invention further provides a manufacture method of square seal, comprising steps of:

step 1, as shown in FIG. 4, providing seal body film material 1, and the seal body film material 1 comprises a first surface and a second surface which are opposite, and upturning the first surface of the seal body film material 1, and locating a circle of rectangular inner frame line on the seal body film material 1, and cutting along the inner frame line with the knife to remove material inside the inner frame line to form a square seal inner frame line 11, and then attaching a layer of PET film on the first surface of the seal body film material 1 to form a first protective film 14.

step 2, as shown in FIG. 5, overturning the seal body film material 1 to upturn the second surface of the seal body film material 1, and locating a circle of rectangular outer frame line at periphery of the square seal inner frame line 11, and cutting a circle of roulette 12 on the seal body film material 1 and the first protective film 14 along the outer frame line.

Specifically, in the step 2, a knife is used to cut in sections to cut a circle of multiple sections of separated slits on the seal body film material 1 and the first protective film 14 along the outer frame line, and thus to form the roulette 12.

Specifically, positions of four corners of the roulette 12 formed in the step 2 are cut L shape slits for the convenience of ripping away at the corners in the following.

Specifically, the roulette 12 is employed for the ripping away for the following waste material. The difficulty level of ripping away can be adjusted with the length of the slits on the roulette 12 and the length between two slits. Apparently, the longer the slit is, the gap between the two slits is shorter, and ripping away becomes easier. Thus, preferably, the length of each section of slit on the roulette 12 is larger than a length between two adjacent slits.

step 3, as shown in FIG. 6, locating a rectangular reserved outer line at periphery of the roulette 12, and using the knife for cutting the seal body film material 1 and the first protective film 14 along the reserved outer line, and removing material outside the rectangular reserved outer line to form a square seal reserved outer frame line 13, and attaching a layer of PET film on the second surface of the seal body film material 1 to form a second protective layer 15 to obtain a square seal;

the square seal comprises an adhesive material body 1', a first protective film 14 and a second protective film 15 which are respectively located at two sides of the adhesive material body 1', and the adhesive material body 1' is a frame shape, and comprises a square seal inner frame line 11 at an inner side, a square seal reserved outer frame line 13 at an outer side, a roulette 12 on the adhesive material body 1' and the first protective film 14 correspondingly between the square seal inner frame line 11 and the square seal reserved outer frame line 13.

Specifically, the square seal obtained in the step 3 is convenient for storage and transportation, and can be temporarily saved or shipped out to be assembled.

Specifically, because the portion between the roulette 12 of the adhesive material body 1' and the square seal reserved outer frame line 13 is the waste material to be ripped away, the distance between the roulette 12 and the square seal reserved outer frame line 13 is set to be B. In condition that the B value is designed to be large enough, the precision of the square seal reserved outer frame line 13 becomes lower. In the cutting process, either of the board knife and the plastic knife can satisfy the process condition, and the price is cheaper.

Specifically, as the square seal obtained in the step 3 is assembled on the backlight module, the second protective film 15 on the square seal is first ripped off, and the adhesive material body 1' is attached on the sealant 32 of the backlight module, and then, material of the adhesive material body 1' and the first protective film 14 outside the roulette 12 is ripped away along the roulette 12 so that the square seal can be easily separated from the waste material. The square seal achieves the narrow frame without the issues of overflow seal and waste material adhesion, and thus, to realize the narrow frame of the backlight module.

Figure 8:
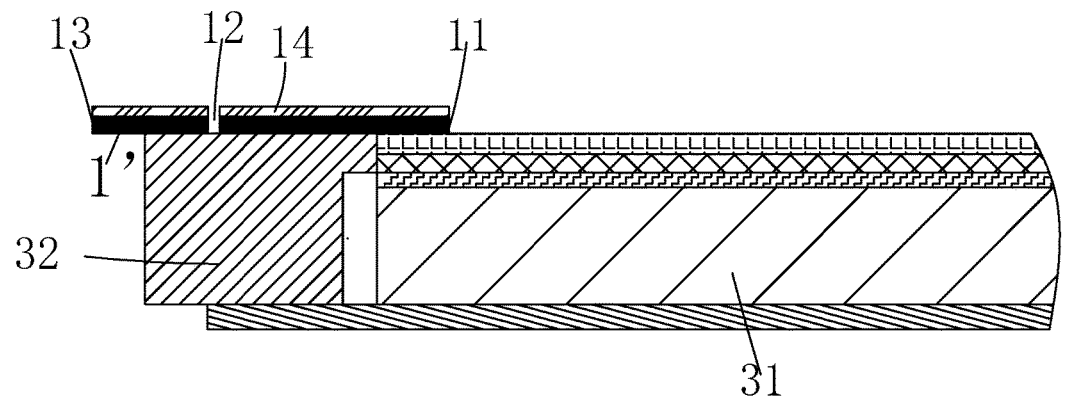
FIG. 8 is a diagram of step 20 of the manufacture method of the backlight module according to the present invention.
Figure 9:
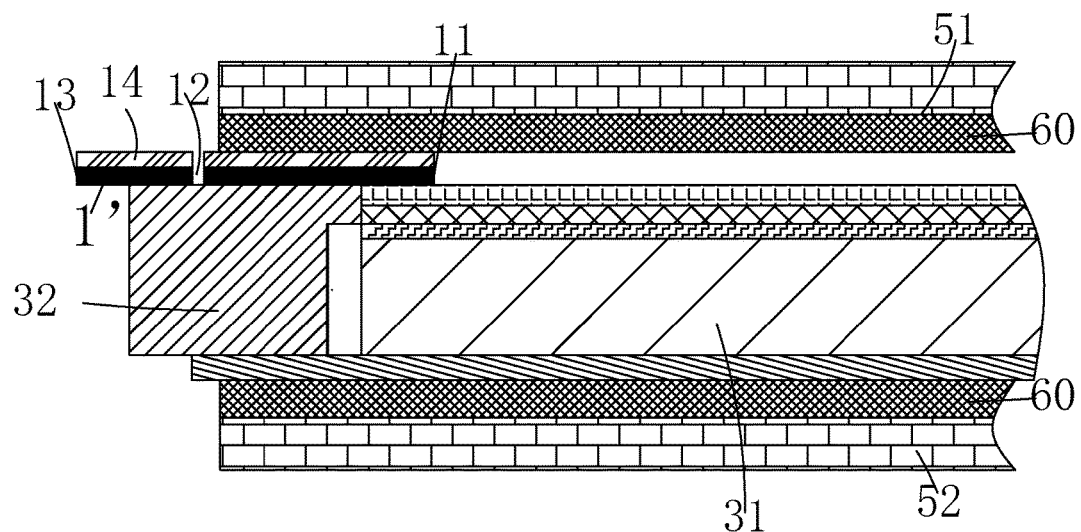
FIG. 9 is a diagram of step 30 of the manufacture method of the backlight module according to the present invention.

Based on the aforesaid square seal, referring to FIG. 7, the present invention further provides a manufacture method of a backlight module, comprising steps of:

step 10, providing square seal, comprising an adhesive material body 1', a first protective film 14 and a second protective film 15 which are respectively located at two sides of the adhesive material body 1', and the adhesive material body 1' is a frame shape, and comprises a rectangular square seal inner frame line 11 at an inner side, a rectangular square seal reserved outer frame line 13 at an outer side, a rectangular roulette 12 on the adhesive material body 1' and the first protective film 14 correspondingly between the square seal inner frame line 11 and the square seal reserved outer frame line 13.

step 20, as shown in FIG. 8, providing a light guide plate 31 and sealant 32, and the sealant 32 is located at periphery of the light guide plate 31, and after ripping off the second protective film 15 on the square seal, attaching one side exposing the adhesive material body 1' on the sealant 32, and covering the gap between the light guide plate 31 and the sealant 32, and extending to cover the periphery edges of the light guide plate 31.

step 30, as shown in FIG. 9, providing a pressing jig, and the pressing jig comprises an upper jig 51 and a lower jig 52, and locating a layer of sponge 60 at upper, lower two sides of the light guide plate 31 and the sealant 32, and employing the upper jig 51 and the lower jig 52 to press periphery edges of the light guide plate 31 and the sealant 32 respectively from above and below, when the sponge 60 is located between the upper jig 51 and the sealant 32 and between the lower jig 52 and the light guide plate 31 so that the stress to the light guide plate 31 and the sealant 32 is uniform, and ripping away material of the adhesive material body 1' and the first protective film 14 outside the roulette 12 along the roulette 12, and removing the pressing jig, and ripping off the rest first protective film 14 on the adhesive material body 1' to obtain the backlight module.

Specifically, in the step 30, with existence of the roulette 12 the formed square seal is hard to have the issue of waste material adhesion and overflow seal; moreover, in the present invention, the adhesive material body 1' of the square seal is first attached on the sealant 32. Then, the pre formed square seal has already been attached on the sealant 32, and then the material of the adhesive material body 1' and the first protective film 14 outside the roulette 12 is ripped away along the roulette 12. The waste material of the square seal can be easily separated from the square seal and the sealant 32, and there will be no issue of overflow seal, and the defect rate can be effectively reduced.

In conclusion, the square seal of the present invention utilizes the roulette design. As being assembled on the backlight module, the redundant material outside the roulette is removed along the roulette to obtain the square seal of narrow frame so that the square seal achieves the narrow frame without the issues of overflow seal and waste material adhesion. The square seal can be easily separated from the waste material to effectively reduce the defect rate. In the manufacture method of the square seal according to the present invention, the square seal inner frame line is first cut on the seal body film material, and then the dotted roulette is formed at position of the square seal outer frame line is pre formed, and finally, the circle of the square seal reserved outer frame line is cut at the periphery of the roulette. The obtained square seal can effectively realize the narrow frame of the square seal, and thus, to realize the narrow frame of the backlight module, and the yield is high. The manufacture method of the backlight module according to the present invention utilizes the aforesaid square seal, which can effectively achieve the narrow frame of the backlight module.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A manufacture method of a square seal, comprising steps of:
   step 1, providing a seal body film material, wherein the seal body film material comprises a first surface and a second surface which are opposite, and upturning the first surface of the seal body film material, and locating a circle of rectangular inner frame line on the seal body film material, and cutting along the inner frame line to remove material inside the inner frame line to form a square seal inner frame line, and then attaching a layer of PET film on the first surface of the seal body film material to form a first protective film;
   step 2, overturning the seal body film material to upturn the second surface of the seal body film material, and locating a circle of rectangular outer frame line outside a periphery of the square seal inner frame line, and cutting a circle of roulette on the seal body film material and the first protective film along the outer frame line;
   step 3, locating a rectangular reserved outer line outside a periphery of the roulette, and cutting the seal body film material and the first protective film along the reserved outer line, and removing material outside the rectangular reserved outer line to form a square seal reserved outer frame line, and attaching a layer of PET film on the second surface of the seal body film material to form a second protective layer to obtain a square seal;
   wherein the square seal comprises an adhesive material body, the first protective film and the second protective film which are respectively located at two sides of the adhesive material body, and the adhesive material body is a frame shape, and comprises the square seal inner frame line at an inner side, the square seal reserved outer frame line at an outer side, the roulette on the adhesive material body and the first protective film correspondingly between the square seal inner frame line and the square seal reserved outer frame line.

2. The manufacture method of the square seal according to claim 1, wherein in the step 2, a knife is used to cut in sections to cut a circle of multiple sections of separated slits on the seal body film material and the first protective film along the outer frame line, and thus to form the roulette.

3. The manufacture method of the square seal according to claim 2, wherein positions of four corners of the roulette formed in the step 2 are cut L shape slits.

4. A manufacture method of a backlight module, comprising steps of:
   step 10, providing square seal, and the square seal comprises an adhesive material body, a first protective film and a second protective film which are respectively located at two sides of the adhesive material body, and the adhesive material body is a frame shape, and comprises a rectangular square seal inner frame line at an inner side, a rectangular square seal reserved outer frame line at an outer side, a rectangular roulette on the adhesive material body and the first protective film correspondingly between the square seal inner frame line and the square seal reserved outer frame line;
   step 20, providing a light guide plate and sealant, and the sealant is located at periphery of the light guide plate, and after ripping off the second protective film on the square seal, attaching one side exposing the adhesive material body on the sealant;
   step 30, providing a pressing jig, and the pressing jig comprises an upper jig and a lower jig, and employing the upper jig and the lower jig to press periphery edges of the sealant and the light guide plate respectively from above and below, and ripping away material of the adhesive material body and the first protective film outside the roulette along the roulette, and removing the pressing jig, and ripping off the rest of the first protective film on the adhesive material body to obtain the backlight module.

5. The manufacture method of the backlight module according to claim 4, wherein the step 30 further comprises: locating a layer of sponge at upper, lower two sides of the sealant and the light guide plate before pressing the sealant and the light guide plate with the upper jig and the lower jig so that the stress to the sealant and the light guide plate is uniform.

* * * * *